United States Patent [19]

Mizuta et al.

[11] Patent Number: 5,706,184
[45] Date of Patent: Jan. 6, 1998

[54] RESONANT CONVERTER WITH A RESONANT CIRCUIT EMPLOYING THE LEAKAGE INDUCTANCE AND DISTRIBUTED CAPACITANCE OF A TRANSFORMER

[75] Inventors: Tsuneo Mizuta; Kaoru Ishimoto, both of Tokyo, Japan

[73] Assignee: NEC Corporation, Tokyo, Japan

[21] Appl. No.: 478,838

[22] Filed: Jun. 7, 1995

[30] Foreign Application Priority Data

Jun. 27, 1994 [JP] Japan .................. 6-144580

[51] Int. Cl.⁶ .................................. H02M 3/335
[52] U.S. Cl. .................................. 363/21; 363/97
[58] Field of Search .................... 363/16, 17, 20, 363/21, 25, 26, 40, 41, 95, 97, 98

[56] References Cited

U.S. PATENT DOCUMENTS

| | | | |
|---|---|---|---|
| 5,065,301 | 11/1991 | Shioya et al. | 363/17 |
| 5,272,612 | 12/1993 | Harada et al. | 363/26 |
| 5,363,287 | 11/1994 | Liu et al. | 363/20 |
| 5,438,497 | 8/1995 | Jain | 363/132 |
| 5,459,650 | 10/1995 | Noro | 363/16 |
| 5,521,807 | 5/1996 | Chen et al. | 363/21 |
| 5,528,481 | 6/1996 | Caldeira et al. | 363/97 |
| 5,530,638 | 6/1996 | Wu | 363/16 |

*Primary Examiner*—Jeffrey L. Sterrett
*Attorney, Agent, or Firm*—Sughrue, Mion, Zinn, Macpeak & Seas, PLLC

[57] ABSTRACT

Secondary side leakage inductance and distributed capacity of a high voltage insulating transformer are constructively employed to function as the resonance coil and resonance condenser of a resonance converter. Increased efficiency is achieved by using a smoothing circuit of choke input construction so as not to reduce the impedance on the secondary side of the transformer.

5 Claims, 4 Drawing Sheets

CURRENT WAVEFORM
BETWEEN COLLECTOR
AND EMITTER OF
SWITCHING ELEMENT

CURRENT WAVEFORM
BETWEEN COLLECTOR
AND EMITTER OF
SWITCHING ELEMENT

TURN OFF | TURN ON | TURN OFF | TURN ON | TURN OFF

RESONANT CONVERTER WITH A RESONANT CIRCUIT EMPLOYING THE LEAKAGE INDUCTANCE AND DISTRIBUTED CAPACITANCE OF A TRANSFORMER

BACKGROUND OF THE INVENTION

1. Field of the Invention

The present invention relates to a resonance converter, and in particular to a high-output resonance converter of the current resonance type.

2. Description of the Related Art

Prior art resonance converters of this type are constructed as shown in FIG. 1. In this figure, the power output by direct current power source 6 is on/off controlled by switching circuit 2 and supplied to the primary side of insulating transformer 5. The induced power from the secondary side of this transformer 5 is converted to direct current power by rectifying circuit 13 and smoothing circuit (composed of choke coil 10 and condenser 14) and supplied to a load not shown.

This direct current output voltage is input to controller 7 for carrying out on/off control of switching element 1 (usually, an FET element or a bipolar transistor element) of switching circuit 2 according to the voltage level of the direct current output voltage for the purpose of stabilizing the direct current output.

A series resonance circuit having resonance coil 3 and resonance condenser 4 is provided on the primary side of insulating transformer 5, and a resonance converter is formed by arranging insulating transformer 5, which is the load, in parallel with resonance condenser 4. Resonance is generated between resonance coil 3 and resonance condenser 4 by turning on switching element 1, and a resonance current is supplied to insulating transformer 5, which is the load. If switching element 1 is turned off when this resonance current is zero, switching loss at the switching element, which can be expressed as (current)×(voltage), theoretically becomes zero, and a highly efficient high-power output can be obtained from the circuit on the secondary side.

When using this type of prior art resonance converter in switching large currents, however, the resonance condenser is prone to deterioration due to ripple current or saturation in the resonance coil, while the use of a large resonance coil and resonance condenser necessitates more installation space and makes it difficult to provide a smaller, lighter, and less expensive converter.

SUMMARY OF THE INVENTION

The object of the present invention is to provide a resonance converter in which the entire circuit can be made compact, light, and inexpensive by reducing the size of the resonance coil and resonance condenser.

According to the present invention, a resonance converter may be obtained which comprises an insulating transformer, switching means for on/off control of the electrical power impressed to the primary side of the insulating transformer, and smoothing-rectifying means for smoothing-rectifying the induced power on the secondary side of the insulating transformer, and which is characterized by having a resonance circuit constituted by the leakage inductance and distributed capacity of the insulating transformer.

In particular, in an insulating transformer having high-voltage output greater than 1 KV, this leakage inductance on the secondary side is several tens of times greater than the leakage inductance on the primary side. As a result, the resonance frequency characteristic of the insulating transformer is dominated by the resonance frequency due to secondary side leakage inductance and distributed capacity.

In the present invention, this leakage inductance and distributed capacity of the high-voltage output insulating transformer is used constructively in the resonance circuit to enable a compact and light-weight device.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

Embodiments of the present invention will next be explained with reference to the figures.

Figure 1:
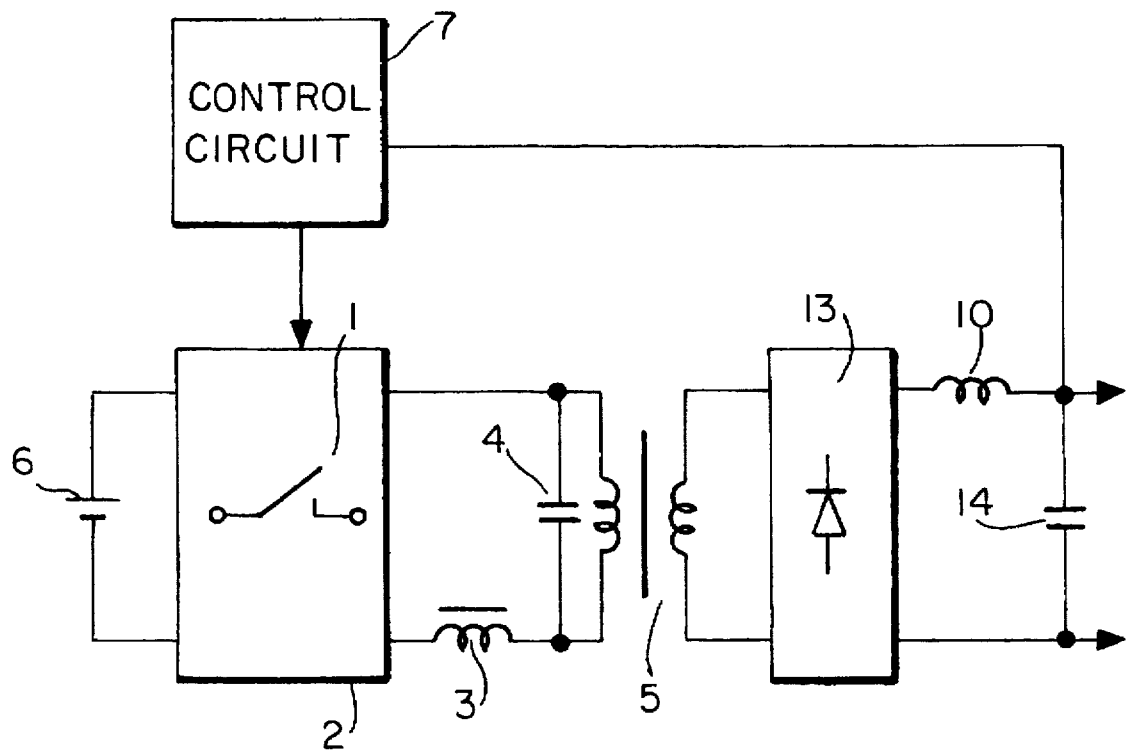
FIG. 1 is a block circuit diagram of a resonance converter of the prior art.
Figure 2:
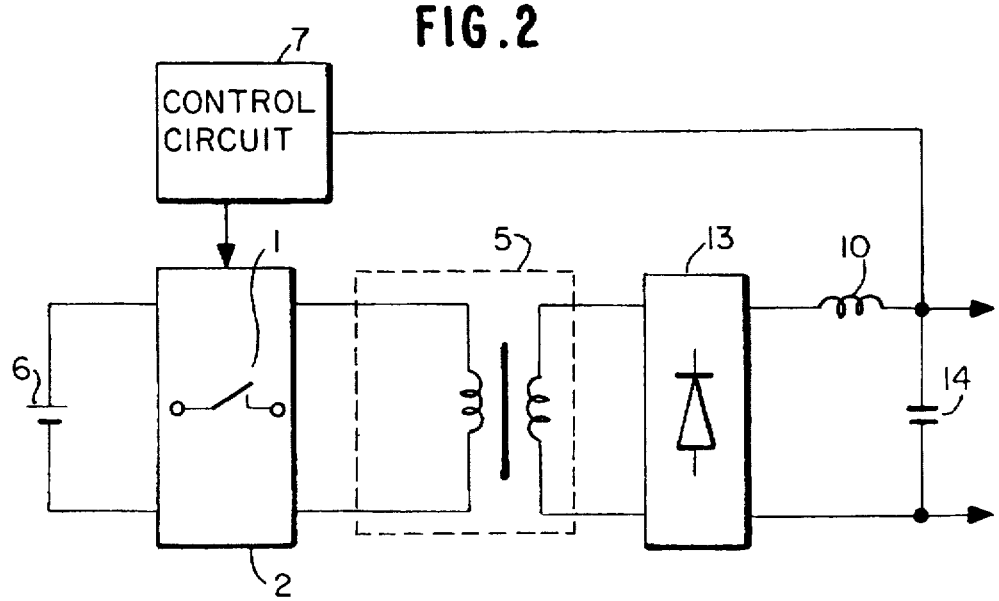
FIG. 2 is a block circuit diagram of one embodiment of the present invention.
Figure 3A:
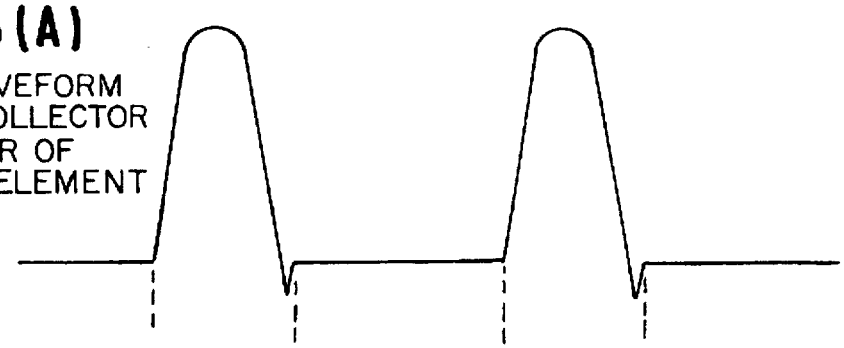
FIGS. 3A and 3B show operation wave forms of the circuit shown in FIG. 2.
Figure 3B:
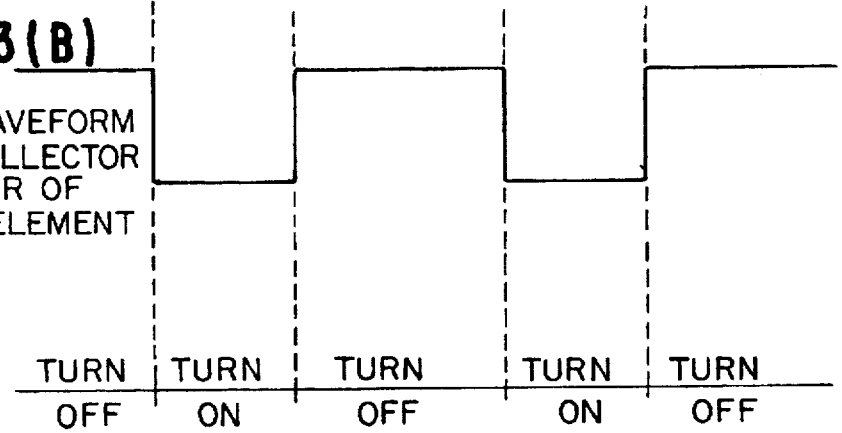

FIG. 2 is a circuit diagram of one embodiment of the present invention in which the same reference numerals are used for parts equivalent to those shown in FIG. 1. In this embodiment, an insulating transformer of high-voltage output (1 KV or greater) is used as transformer 5. The leakage inductance and distributed capacity on the secondary side of this transformer are constructively used as a resonance element, thereby dispensing with the resonance coil 3 and resonance condenser 4 used in the prior art converter of FIG. 1.

Figure 5:
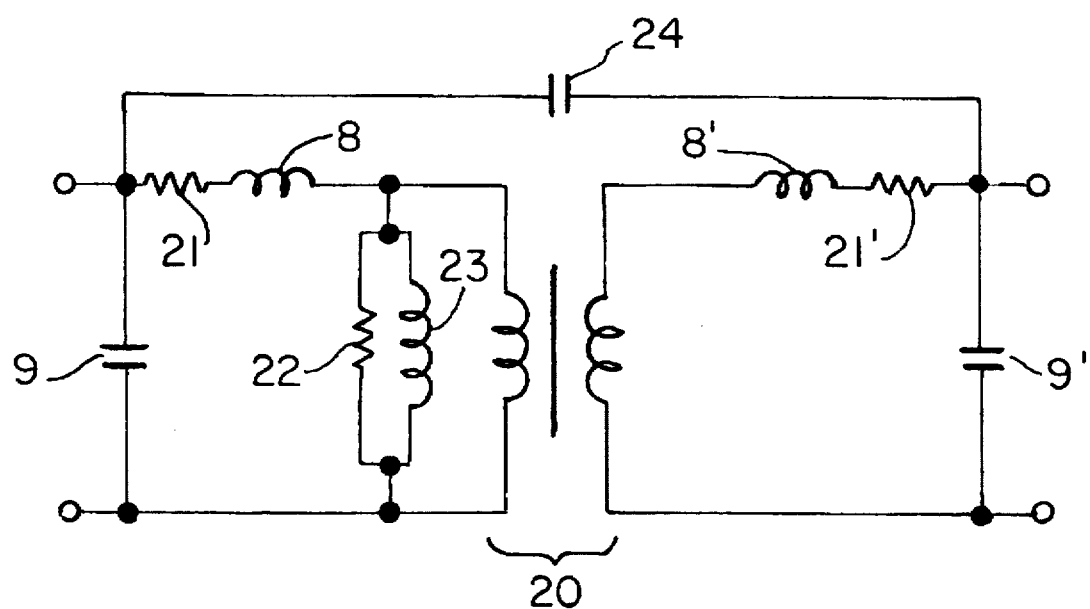
FIG. 5 is an equivalent circuit diagram of an insulating transformer used in the embodiments of the present invention.

An equivalent circuit of this insulating transformer 5 is shown in FIG. 5. Here, the portion indicated by reference numeral 20 is an ideal transformer, on the primary side of which exist distributed capacity 9, leakage inductance 8, equivalent resistance 21, and in addition, a parallel circuit having resistance 22 and inductance 23 of the primary side coil. In addition, the secondary side has distributed capacity 9', leakage inductance 8', and equivalent resistance 21', and distributed capacity 24 exists between the primary and secondary sides.

In this case, if a device in which an insulating transformer of high-voltage output of at least 1 KV is used, as described hereinabove, secondary side leakage inductance 8' is several tens of times greater than the primary side leakage inductance 8, and the resonance frequency characteristic of this transformer 5 will be dominated by a frequency due to this secondary side leakage inductance 8' and distributed capacity 9'.

The smoothing circuit which smooths the rectified output of rectifying circuit 13 is constructed as a choke input type, and the secondary side load of transformer 5 is of high impedance, and a resonance current can therefore be efficiently generated on the secondary side of transformer 5.

Since this resonance on the secondary side is the load as seen from the primary side of transformer 5, the primary side current also forms a resonance wave form, and as shown in FIG. 2, when the primary side resonance current wave form reaches a minimum value or zero, frequency control is performed at control circuit 7 such that switching element 1 is turned off, thereby allowing efficient transmission control of electrical energy from the primary side to the secondary side of transformer 5.

Figure 4A:
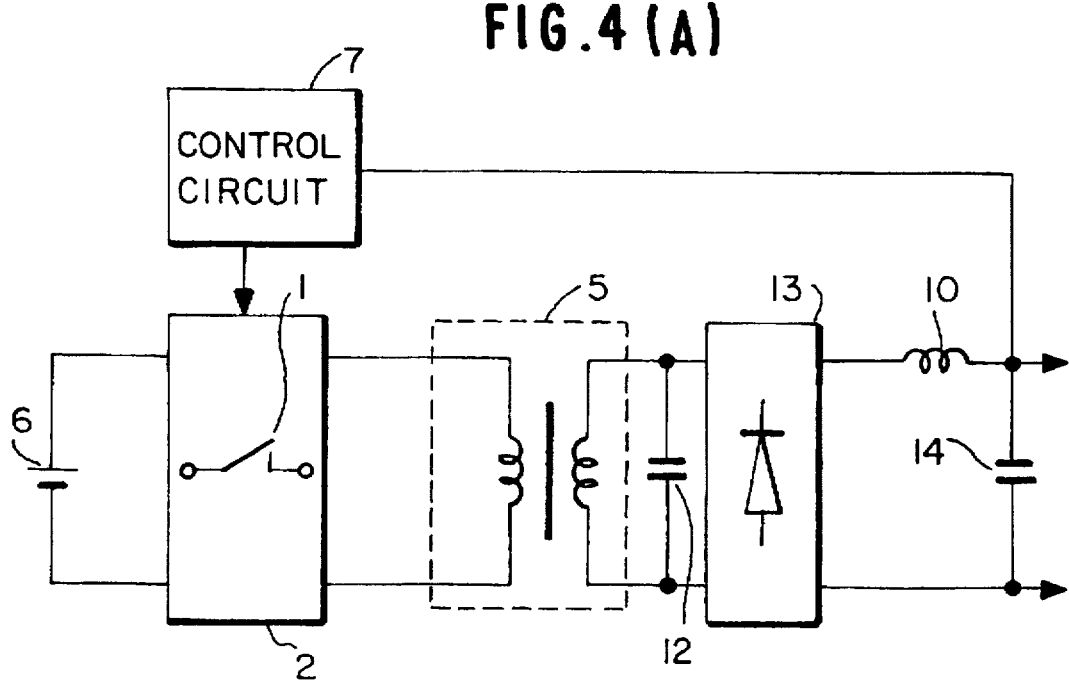
FIG. 4A is a block circuit diagram of another embodiment of the present invention.
Figure 4B:
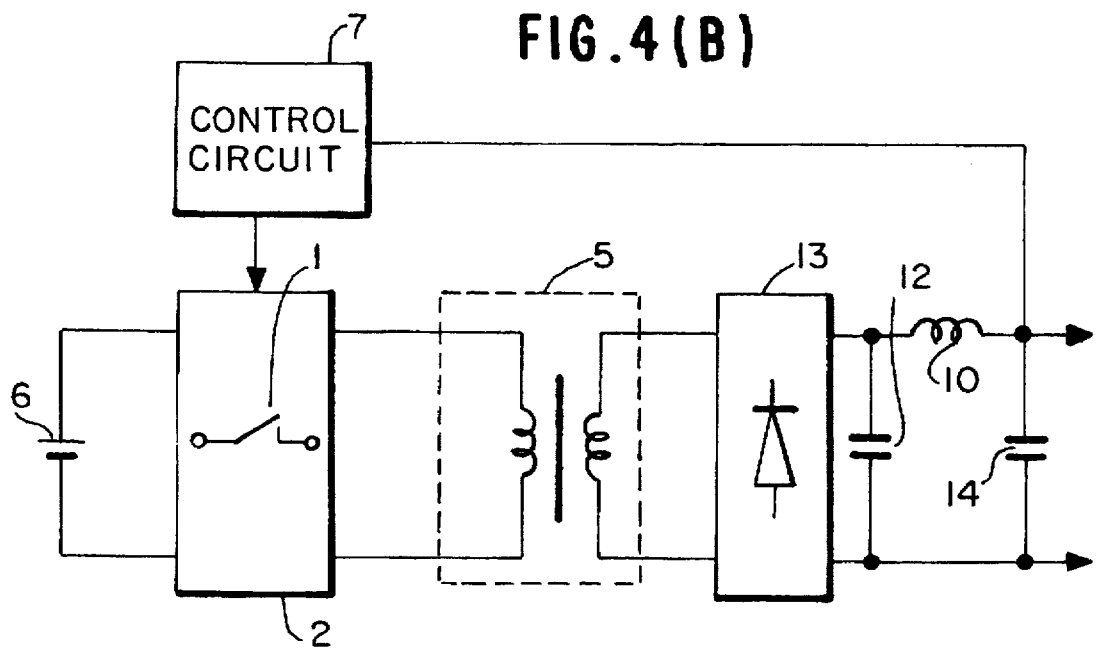
FIG. 4B is a block circuit diagram of yet another embodiment of the present invention.

FIGS. 4A and 4B each show another embodiment of the present invention, identical reference numerals being used for parts equivalent to those shown in FIG. 2. FIG. 4A shows an example in which a condenser 12 for resonance frequency regulation is parallel connected in the secondary output portion of transformer 5.

By selecting the capacitance of this condenser 12, variation in the resonance frequency that is caused by variance in the distributed capacity and leakage inductance of transformer 5 can be absorbed and made uniform, thereby enabling a constantly correct frequency. FIG. 4B shows an example in which a condenser 12 for resonance frequency regulation is parallel connected in the output portion of rectifying circuit 13.

The condenser 12 for resonance frequency regulation in both FIGS. 4A and 4B is for regulation and its capacitance should therefore be small, with the result that the addition of this condenser 12 will not cause a decrease in the load impedance on the secondary side of transformer 5.

As described hereinabove, according to the present invention, a resonance current is generated by constructively using the leakage inductance and distributed capacity of an insulating transformer to make up a resonance circuit, thereby eliminating the need for a resonance coil and resonance condenser and enabling a device that is not only more compact and light-weight, but also less expensive.

In addition, when adjusting resonance frequency, a favorable effect can be obtained by merely adding a condenser of small capacitance.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A resonance converter comprising:

an insulating transformer, the secondary side of which is the high-voltage side of at least 1 KV;

switching means for on/off control of electric power supplied to the primary side of said insulating transformer;

smoothing-rectifying means for smoothing-rectifying induced electric power on the secondary side of said insulating transformer; and control means, coupled to said smoothing-rectifying means, for performing on/off control of said switching means in accordance with a direct current voltage supplied from said smoothing-rectifying means; and a resonance circuit wherein resonance is generated only by leakage inductance and distributed capacity on the secondary side of said insulating transformer.

2. The resonance converter according to claim 1, wherein said control means is arranged to turn off said switching means when the resonance current reaches one of a minimum value and zero.

3. The resonance converter according to claim 1, wherein a smoothing portion of said smoothing-rectifying means comprises a choke coil.

4. A resonance converter comprising:

an insulating transformer, the secondary side of which is the high-voltage side of at least 1 KV;

switching means for on/off control of electric power supplied to the primary side of said insulating, transformer:

smoothing-rectifying means for smoothing-rectifying induced electric power on the secondary side of said insulating transformer; and control means, coupled to said smoothing-rectifying means, for performing on/off control of said switching means in accordance with a direct current voltage supplied from said smoothing-rectifying means; and a resonance circuit wherein resonance is generated by leakage inductance and distributed capacity on the secondary side of said insulating transformer;

wherein a condenser is connected in parallel with one of an input and an output of a rectifying portion of said smoothing-rectifying means for regulating the resonance frequency of said resonance circuit.

5. The resonance converter according to claim 4, wherein a smoothing portion of said smoothing-rectifying means comprises a choke coil.

* * * * *